(12) United States Patent
Hergenrother et al.

(10) Patent No.: US 6,958,192 B2
(45) Date of Patent: *Oct. 25, 2005

(54) POLYIMIDES FROM 2,3,3',4'-BIPHENYLTETRACARBOXYLIC DIANHYDRIDE AND AROMATIC DIAMINES

(75) Inventors: Paul M. Hergenrother, Yorktown, VA (US); Joseph G. Smith, Jr., Smithfield, VA (US); John W. Connell, Yorktown, VA (US); Kent A. Watson, New Kent, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 167 days.

This patent is subject to a terminal disclaimer.

(21) Appl. No.: 10/414,562

(22) Filed: Apr. 7, 2003

(65) Prior Publication Data

US 2003/0212243 A1 Nov. 13, 2003

Related U.S. Application Data

(60) Provisional application No. 60/373,342, filed on Apr. 5, 2002.

(51) Int. Cl.[7] .......................... B32B 27/00; C08G 73/10
(52) U.S. Cl. .................... 428/473.5; 428/220; 528/170; 528/353
(58) Field of Search ................................ 528/125, 128, 528/172, 173–175, 179, 183, 185, 188, 220, 229, 350, 352, 353; 428/395, 396, 473.5

(56) References Cited

U.S. PATENT DOCUMENTS

| | | | |
|---|---|---|---|
| 4,895,972 A | | 1/1990 | Stoakley et al. |
| 4,915,894 A | | 4/1990 | Mitsui et al. |
| 5,145,942 A | | 9/1992 | Hergenrother et al. |
| 5,237,044 A | | 8/1993 | Saruwatari et al. |
| 5,260,412 A | | 11/1993 | Yamamoto et al. |
| 5,606,014 A | | 2/1997 | Connell et al. |
| 5,753,407 A | | 5/1998 | Oba |
| 5,830,976 A | | 11/1998 | Sugimori et al. |
| 5,866,676 A | * | 2/1999 | Jensen ........................ 528/353 |
| 6,040,418 A | | 3/2000 | Yamamoto et al. |
| 6,281,323 B1 | * | 8/2001 | Yokota et al. .............. 528/170 |
| 6,359,107 B1 | | 3/2002 | Connell et al. |
| 6,458,912 B1 | | 10/2002 | Kuroki et al. |
| 6,555,647 B2 | | 4/2003 | Tsumiyama |
| 6,841,652 B2 | * | 1/2005 | Connell et al. ............. 528/337 |
| 2002/0023906 A1 | | 2/2002 | Yamamoto et al. |
| 2002/0040068 A1 | | 4/2002 | Yamaguchi et al. |
| 2002/0052464 A1 | | 5/2002 | Yamaguchi et al. |
| 2002/0058149 A1 | | 5/2002 | Yamamoto et al. |
| 2002/0151234 A1 | | 10/2002 | Ozawa et al. |
| 2002/0177000 A1 | | 11/2002 | Katsuki et al. |

FOREIGN PATENT DOCUMENTS

| | | |
|---|---|---|
| JP | 360035026 A | 2/1985 |
| JP | 401221362 A | 9/1989 |
| JP | 405032894 A | 2/1993 |
| JP | 410045918 A | 2/1998 |
| JP | 410310639 A | 11/1998 |

\* cited by examiner

*Primary Examiner*—P. Hampton Hightower
(74) *Attorney, Agent, or Firm*—Robin W. Edwards

(57) ABSTRACT

The present invention relates generally to polyimides. It relates particularly to novel polyimides prepared from 2,3,3',4'-biphenyltetracarboxylic dianhydride and aromatic diamines. These novel polyimides have low color, good solubility, high thermal emissivity, low solar absorptivity and high tensile strength.

8 Claims, 11 Drawing Sheets

| Monomer | Monomer Structure | Source | Melting Point, °C | Recrystallization Solvent |
|---|---|---|---|---|
| 1 | H₂N–C₆H₄–O–C₆H₄–C(=O)–C₆H₄–C(=O)–C₆H₄–O–C₆H₄–NH₂ | Daychem Laboratories, Inc. | 163 – 164.5 | Butanol |
| 2 | H₂N–C₆H₄–O–C₆H₄–C(=O)–C₆H₄–C(=O)–C₆H₄–O–C₆H₄–NH₂ | Daychem Laboratories, Inc. | 238.5 – 239.5 | Used as-received |
| 3 | H₂N–C₆H₄–O–C₆H₄–C(=O)–C₆H₄–C₆H₄–C(=O)–C₆H₄–O–C₆H₄–NH₂ | Made in-house | 231 – 232.5 | Dioxane/water |
| 4 | H₂N–C₆H₄–O–C₆H₄–NH₂ | Mitsui Chemicals, Inc. | 107 – 108.5 | Used as-received |
| 5 | H₂N–C₆H₄–O–C₆H₄–O–C₆H₄–NH₂ | Mitsui Chemicals, Inc. | 116 – 117 | Ethanol/water |
| 6 | H₂N–C₆H₄–O–C₆H₄–O–C₆H₄–NH₂ | ChrisKev Co., Inc. | 171 – 172.5 | Used as-received |

FIG. 1

| Monomer | Monomer Structure | Source | Melting Point, °C | Recrystallization Solvent |
|---|---|---|---|---|
| 7 | (structure: H₂N–Ar(CF₃)–Ar(CF₃)–NH₂) | ChrisKev Co., Inc. | 179.5 - 182 | as-received |
| 8 | (structure with C(CF₃)₂ bridge and NH₂ groups) | Central Glass Co., Ltd. | 159 - 161 | Isopropanol |
| 9 | (structure with P=O, phenyl, ether linkages, NH₂) | Sarchem Laboratories, Inc. | 195 - 196 | Methanol/ ethyl acetate |
| 10 | (structure with P=O, phenyl, ether linkages, NH₂) | Made in-house | 198.5 - 200 | Ethanol/water |
| 11 | (dianhydride structure) | ChrisKev Co., Inc. | 297 - 298 | Used as-received |
| 12 | (dianhydride structure) | Ube Industries, Ltd. | 195.5 - 197 | Toluene/acetic anhydride |

FIG. 2

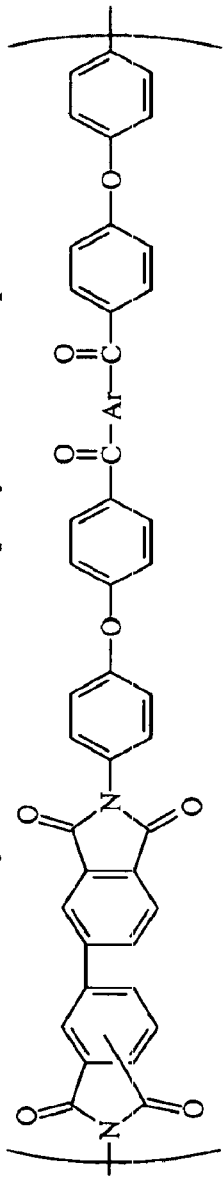

Polyimide Structure/Property Relationship[1]

| Polymer No./ Dianhydride | Ar | $\eta_{inh}$ dL/g PAA | Tg (Tm), °C Film[2] | Tg (Tm), °C | Film Color | 23°C Tensile Properties | | |
|---|---|---|---|---|---|---|---|---|
| | | | | | | Strength, MPa | Modulus, GPa | Elong, % |
| 3-1/A | (m-phenyl) | 1.21 | 237 | New | Yellow | 95.1 | 2.61 | 11.2 |
| 3-1/S | (m-phenyl) | 1.25 | 223 | 222 | Yellow | 93.1 | 2.40 | 6.5 |
| 3-2/A | (p-phenyl) | 1.08 | 256 | New | Yellow | 91.7 | 2.52 | 10.3 |
| 3-2/S | (p-phenyl) | 2.13 | 239 (407) | 245 (414) | Yellow, opaque Orange, opaque | 114.4 124.8 | 3.33 3.45 | 15.5 10.0 |
| 3-3/A | (naphthyl) | 0.95 | 262 (378, 403)[3] | New | Light orange | 99.3 | 2.43 | 9.0 |
| 3-3/S | (naphthyl) | 1.19 | 263 | 246 (424) | Orange, opaque | 111.7 | 2.35 | 3.4 |
| | | | 252 (417) | | | | | |

1. Made via the polyamide acids
2. Film cured for 1 hour at 250°C
3. Film cured for 1 hour at 350°C

FIG. 3

Polyimide Structure/Property Relationship[1]

| Polymer No./ Dianhydride | Ar | $\eta_{inh}$ dL/g PAA | Tg (Tm), °C Film[2] | Tg (Tm), °C | Film Color | 23°C Tensile Properties Strength, MPa | Modulus, GPa | Elong, % |
|---|---|---|---|---|---|---|---|---|
| 4-1/A | | 0.73 | 207 | New | Near colorless | 109.6 | 3.02 | 5.9 |
| 4-1/S | | 0.87 | 200 | 202 | Pale yellow | 118.6 | 3.48 | 25.5 |
| 4-2/A | | 1.51 | 248 | New | Light yellow | 80.0 | 2.47 | 5.4 |
| 4-2/S | | 1.22 | 211 (391) | 210 (395) | Yellow, opaque | 122.7 | 3.57 | 90 |
| 4-3/A | | 1.44 | 276 | New | Pale yellow | 98.6 | 2.38 | 8.9 |
| 4-3/S | | 2.20 | 265[3] | 259 (417) | Yellow | 143.4 | 4.10 | 34 |

1. Made via the polyamide acids
2. Film cured for 1 hour at 250°C
3. Film cured for 1 hour at 300°C

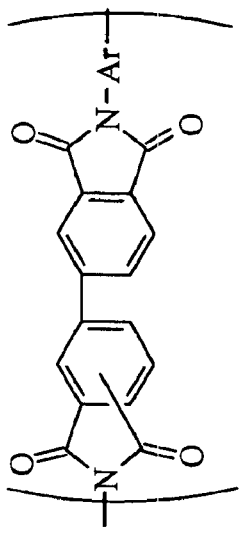

FIG. 5

Polyimide Structure/Property Relationship[1]

| Polymer No./Dianhydride | Ar | $\eta_{inh}$ dL/g PAA | Tg, °C Film[2] | Tg, °C | Film Color | 23°C Tensile Properties | | |
|---|---|---|---|---|---|---|---|---|
| | | | | | | Strength, MPa | Modulus, GPa | Elong, % |
| 5-1/A | (CF3-substituted biphenyl dimethyl) | 0.72 0.83[3] imide | 312 ND[2] 329[4] | New | Near colorless Pale Yellow Orange | Brittle 65.5 | 2.99 | 2.4 4.6 |
| 5-1/S | (CF3-substituted biphenyl dimethyl) | 1.46 | 280 | 287 | Very pale yellow | 144.1 | 5.18 | 4.2 |
| 5-2/A | (hexafluoroisopropylidene bis(phenoxy) tolyl) | 1.14 | 261 | New | Pale Yellow | 124.1 | 3.04 | 7.4 |
| 5-2/S | (hexafluoroisopropylidene bis(phenoxy) tolyl) | 1.93 | 254 | 260 | Yellow | 111.0 | 3.03 | 31.2 |

1. Made via the polyamide acid
2. Film cured for 1 hour at 250°C (ND, not detected)
3. Made in m-cresol
4. Film cured for 1 hour at 350°C

Polyimide Structure/Property Relationship

| Polymer No./ Diahydride | Ar | $\eta_{inh}$ dL/g | Tg, °C Film | Tg, °C | Film Color | 23°C Tensile Properties | | |
|---|---|---|---|---|---|---|---|---|
| | | | | | | Strength, MPa | Modulus, GPa | Elong, % |
| 6-1/A[1] | | 0.55 imide | 233[3] | New | Near colorless | 73.1 | 3.46 | 2.9 |
| 6-1/S[1] | | 0.69 imide | 230[3] | 234 | Pale yellow | 99.3 | 3.14 | 4.7 |
| 6-2/A[2] | | 0.59 PAA | 259[4] | New | Orange | 108.9 | 3.38 | 12.6 |
| 6-2/S[2] | | 1.00 PAA | 258[4] | New | Orange | 151.0 | 4.34 | 31.4 |

1. Made in m-cresol
2. Made via the polyamide acid
3. Films cured for 1 hour at 250°C
4. Films cured for 1 hour at 300°C Properties of a-BPDA Polymers and Films Cured at Different Temperatures

| Diamine | η$_{inh}$, dL/g PAA | Cure Temp. for 1 hour, °C[1] | Tg, °C (Film) | Film Color | Transmission at 500 nm, % (Film) | 23°C Tensile Properties | | |
|---|---|---|---|---|---|---|---|---|
| | | | | | | Strength, MPa | Modulus, GPa | Elong, % |
| 1,3,3-APB[2] | 0.65 | 250 | 204 | Near colorless | - | 107.5 | 3.31 | 4.1 |
| | | 300 | 207 | Pale yellow | - | 113.8 | 3.05 | 5.2 |
| | | 350 | 209 | Yellow | - | 124.0 | 3.28 | 5.7 |
| | 0.66 | 250 | 202 | Near colorless | 87 | 105.5 | 2.95 | 4.5 |
| | | 300 | 207 | Pale yellow | 85 | 118.6 | 3.11 | 5.3 |
| | | 350 | 208 | Yellow | 69 | 120.0 | 3.21 | 5.7 |
| 1,4,4-APB[3] | 1.47 | 250 | 276 | Pale yellow | - | 102.7 | 2.66 | 6.8 |
| | | 300 | 278 | Yellow | - | 97.2 | 2.56 | 21.8 |
| | | 350 | 287 | Light orange | - | 93.8 | 2.33 | 43.7 |
| | 1.49 | 250 | 278 | Pale yellow | 85 | 107.5 | 2.69 | 7.9 |
| | | 300 | 279 | Yellow | 84 | 106.2 | 2.65 | 12.9 |
| | | 350 | 285 | Yellow | 66 | 103.4 | 2.65 | 16.5 |

1. Cure temperatures are accumulative (i.e. 350°C cure is 1 hour each at 250, 300, and 350°C)
2. 1,3-Bis(3-aminophenoxy)benzene (Monomer 4)
3. 1,4-Bis(4-aminophenoxy)benzene (Monomer 6)

FIG. 7

Properties of s-BPDA Polymers and Films Cured at Different Temperatures

| Diamine | $\eta_{inh}$ dL/g PAA | Cure Temp. for 1 hour, °C[1] | Tg (Tm), °C (Film) | Film Color | Transmission at 500 nm, % (Film) | 23°C Tensile Properties | | |
|---|---|---|---|---|---|---|---|---|
| | | | | | | Strength, MPa | Modulus, GPa | Elong, % |
| 1,3,3-APB[2] | 0.97 | 250 | 202 | Pale yellow | 82 | 124.1 | 3.36 | 59 |
| | | 300 | 202 | Yellow | 78 | 124.1 | 3.34 | 53 |
| | | 350 | 204 | Intense yellow | 61 | 120.6 | 3.32 | 18 |
| 1,4,4-APB[3] | 1.93 | 250 | 263 (461) | Yellow | 77 | 135.8 | 3.51 | 26 |
| | | 300 | ND (460) | Yellow | 75 | 141.3 | 3.38 | 45 |
| | | 350 | 278 (385, 455) | Intense yellow | 60 | 155.1 | 3.59 | 57 |

1. Cure temperatures are accumulative (i.e. 350°C cure is 1 hour each at 250, 300, and 350°C)
2. 1,3-Bis(3-aminophenoxy)benzene (Monomer 4)
3. 1,4-Bis(4-aminophenoxy)benzene (Monomer 6)

FIG. 8

Thermogravimetric Analysis of Films in Nitrogen*

| Polymer | Film Curing Temperature, °C | Weight Loss (%) at Temperature (°C) | | | |
|---|---|---|---|---|---|
| | | 300 | 350 | 450 | 500 |
| a-BPDA/1,3,3-APB | 250 | 0.12 | 0.17 | 0.67 | 1.94 |
| | 300 | 0.00 | 0.03 | 0.59 | 2.25 |
| | 350 | 0.00 | 0.00 | 0.54 | 3.30 |
| a-BPDA/1,4,4-APB | 250 | 0.09 | 0.17 | 0.55 | 1.36 |
| | 300 | 0.00 | 0.03 | 0.59 | 2.15 |
| | 350 | 0.00 | 0.00 | 0.35 | 2.30 |

* Films were dried at 100°C for 0.5 hour prior to analysis

FIG. 9

Solar Absorptivity and Thermal Emissivity of Polyimide Films

| Polymer No. from FIGs. 4-6 | Solar Absorptivity, α | Thermal Emissivity, ε | Film Thickness, mm |
|---|---|---|---|
| 4-1/A | 0.072 | 0.665 | 0.064 |
| 4-1/S | 0.082 | 0.583 | 0.028 |
| 4-2/A | 0.092 | 0.596 | 0.033 |
| 4-2/S | 0.168 | 0.592 | 0.046 |
| 4-3/A | 0.089 | 0.558 | 0.046 |
| 4-3/S | 0.121 | 0.491 | 0.036 |
| 5-1/A | 0.101 | 0.620 | 0.051 |
| 5-1/S | 0.108 | 0.511 | 0.033 |
| 5-2/A | 0.108 | 0.590 | 0.038 |
| 5-2/S | 0.096 | 0.461 | 0.020 |
| 6-1/A | 0.051 | 0.575 | 0.025 |
| 6-1/S | 0.108 | 0.620 | 0.048 |
| 6-2/A | 0.159 | 0.622 | 0.041 |
| 6-2/S | 0.288 | 0.533 | 0.023 |

FIG. 10

POLYIMIDES FROM 2,3,3',4'-BIPHENYLTETRACARBOXYLIC DIANHYDRIDE AND AROMATIC DIAMINES

CROSS-REFERENCE TO RELATED APPLICATION

This application claims the benefit of U.S. Provisional Application No. 60/373,342 filed in the United States Patent Office on Apr. 5, 2002.

ORIGIN OF THE INVENTION

This invention was jointly made by employees of the United States Government and a contract employee during the performance of work under a NASA contract which is subject to the provisions of Public Law 95-517 (35 USC 202) in which the contractor has elected not to retain title and may be manufactured and used by or for the government for governmental purposes without the payment of royalties thereon or therefor.

BACKGROUND OF THE INVENTION

1. Field of the Invention

The present invention relates generally to polyimides. It relates particularly to novel polyimides prepared from 2,3,3',4'-biphenyltetracarboxylic dianhydride and aromatic diamines.

2. Description of the Related Art

Since 1960, more attention has focused on polyimides than any other high performance/high temperature polymers. This is due primarily to the availability of polyimide monomers (particularly aromatic dianhydrides and diamines), the ease of polymer synthesis, and their unique combination of physical and mechanical properties. A significant amount of technology has been developed such that polyimides have found wide spread commercial use as adhesives, coatings, composite matrices, fibers, films, foams, membranes and moldings. Although there are many different synthetic routes to polyimides, the most popular is the reaction of an aromatic dianhydride with an aromatic diamine to form a soluble precursor polyamide acid (amic acid) that is subsequently chemically or thermally converted to the polyimide.

Over the years a tremendous amount of work has been performed on structure/property relationships in polyimides to obtain fundamental information that could be used to develop polyimides with unique combination of properties for demanding applications. More recently, nanoparticles (e.g. clays, carbon nanotubes, inorganic nanoparticles, etc.) have been incorporated within polyimides to enhance certain mechanical and physical properties.

The National Aeronautics and Space Administration has several space applications that currently use or are evaluating polyimides. These include thin films as membranes on antennas, concentrators, coatings on second-surface mirrors, solar sails, sunshades, thermal/optical coatings and multi-layer thermal insulation (MLI) blanket materials. Depending upon the application, the film will require a unique combination of properties. These may include atomic oxygen resistance, UV and VUV resistance, low color/low solar absorption, electron and proton resistance, tear/wrinkle resistance for packaging and deployment, and high mechanical properties (strength, modulus and toughness). Atomic oxygen resistance coupled with low color and UV stability has been introduced into polyimides by using phenylphosphine oxide containing monomers.

A significant amount of work has concentrated on the polyimide from the reaction of pyromellitic dianhydride and 4,4'-oxydianiline. Several products are based upon this polymer [poly(4,4'-oxydiphenylenepyromellitimide)] such as Pyre ML® wire enamel [I. S. T. (MA) Corporation], commercial films (Kapton® produced by Du Pont and Apical® produced by Kaneka) and a Du Pont molded product, Vespel®. Another well-known film made via a polyamide acid from the reaction of 3,3',4,4'-biphenyltetracarboxylic dianhydride (s-BPDA) and 1,4-phenylenediamine is Upilex® S produced by Ube Industries, Ltd.

Despite all of the known polyimides with good properties, there exists a need for a novel polyimide having low color, good solubility, high thermal emissivity, low solar absorptivity and high tensile properties.

It is therefore a primary object of the present invention to provide novel polyimides with excellent properties.

It is another object of the present invention to provide novel polyimides made from 2,3,3',4'-biphenyltetracarboxylic dianhydride and aromatic diamines.

It is yet another object of the present invention to provide novel polyimides having low color, good solubility, high thermal emissivity, low solar absorptivity and high tensile properties.

It is a further object of the present invention to provide novel polyimides suitable for thin films as membranes on antennas, concentrators, coatings on second-surface mirrors, solar sails, sunshades, thermal/optical coatings and MLI blanket materials.

SUMMARY OF THE INVENTION

According to the present invention, the forgoing and additional objects are obtained by synthesizing novel polyimides with 2,3,3',4'-biphenyltetracarboxylic dianhydride (a-BPDA).

Specifically, the novel polyimides were obtained by reacting a-BPDA and a diamine selected from the group consisting of:

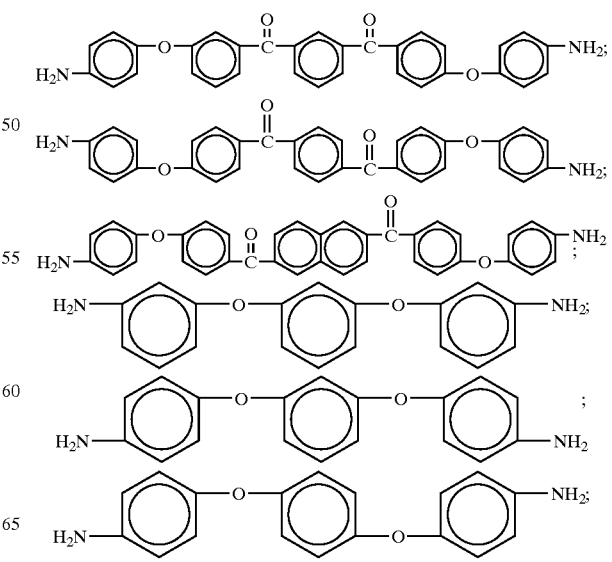

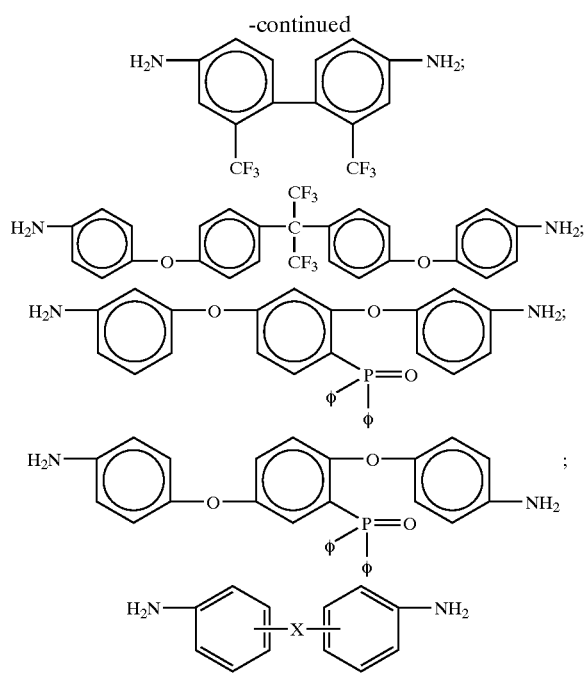

wherein X is selected from the group consisting of:
SO$_2$, C(CH$_3$)$_2$, C(CF$_3$)$_2$, C(CH$_3$)phenyl, C(CF$_3$)phenyl, 3,4'-O, 3,3'-O,

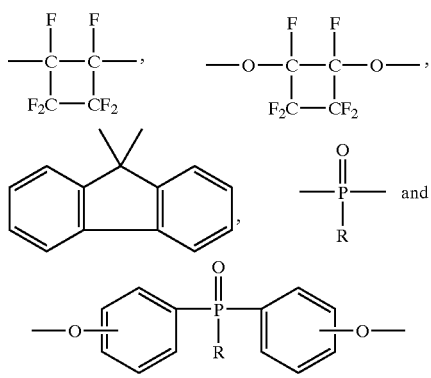

wherein R is phenyl and CH$_3$;

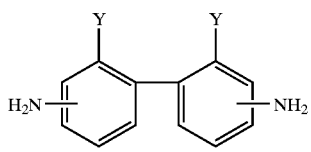

wherein Y is selected from the group consisting of CH$_3$, phenyl, chloro and bromo;

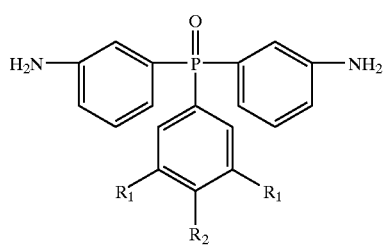

wherein R$_1$ is CF$_3$ and R$_2$ is H, and
wherein R$_1$ is H and R$_2$ is CF$_3$;
and

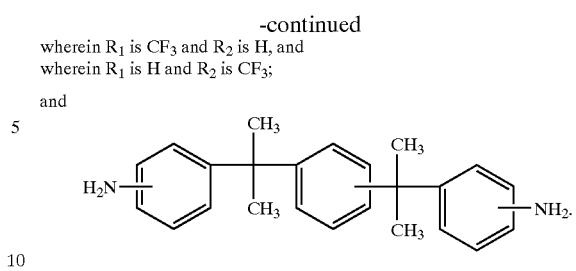

BRIEF DESCRIPTION OF THE DRAWINGS

For a more complete understanding of the present invention, including its objects and attending benefits, reference should be made to the Detailed Description of the Invention, which is set forth in detail below. This Detailed Description should be read together with the accompanying drawings, wherein:

FIG. 1 is a table providing monomer information.

FIG. 2 is a table providing further monomer information.

FIGS. 3, 4, 5 and 6 are tables presenting various polyimide structures and their properties.

FIG. 7 is a table presenting properties of a-BPDA polymers and films cured at different temperatures.

FIG. 8 is a table presenting properties of s-BPDA polymers and films cured at different temperatures.

FIG. 9 is a table presenting thermogravimetric analysis of films in nitrogen.

FIG. 10 is a table presenting solar absorptivity and thermal emissivity of polyimide films.

DETAILED DESCRIPTION OF THE INVENTION

Figure 4:
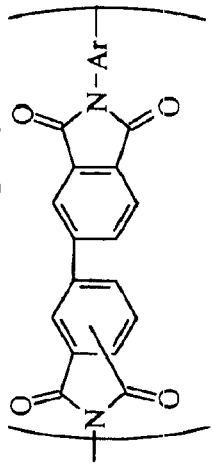

Novel polyimides were made from a-BPDA and various aromatic diamines. The properties of a sample of a-BPDA polyimides were compared with those of polyimides prepared from the reaction of s-BPDA with the same aromatic diamines. Films of the a-BPDA polyimides had higher glass transition temperatures (Tgs) and less color than the corresponding s-BPDA polyimide films. Light transmission at 500 nm, solar absorptivity and thermal emissivity were also determined on certain films. Films of similar polyimides based upon a-BPDA and s-BPDA containing meta linkages and others containing para linkages were each cured at 250, 300, and 350° C. The films were characterized primarily by Tg, color and tensile properties. The a-BPDA meta linked polyimide films had tensile strengths and moduli higher than films of the s-BPDA para linked polyimide. The same phenomenon was not observed for the s-BPDA meta and para linked polyimides.

Monomers and other chemicals. The monomers in FIG. 1 and FIG. 2 were obtained from commercial sources, custom synthesis houses or synthesized in-house. The synthesis of monomer 10 is described below. Anhydrous (99.8%) N,N-dimethylacetamide (DMAC) was obtained from Aldrich and used as-received. Meta-Cresol was obtained from Fluka and redistilled under a nitrogen atmosphere. All other chemicals were obtained from commercial sources and used as-received.

Preparation of [2,5-bis(4-aminophenoxy)phenyl] diphenylphosphine oxide (monomer 10). Into a flame dried 2 L three neck round bottomed flask equipped with a mechanical stirrer, nitrogen gas inlet, pressure equalizing addition funnel, and drying tube were charged p-benzoquinone (30.16 g, 0.2790 mol) and toluene (750 mL). Diphenylphosphine oxide (56.42 g, 0.2790 mol) in toluene (250 mL) was added dropwise over 0.5 hour to the stirred solution at room temperature under nitrogen. The solution color changed from a dark brown to yellow with the formation of a gum. Upon further stirring, a grey solid formed. The solid was isolated, washed with toluene and then diethyl ether, and dried at 110° C. in flowing air to afford 74.0 g (85% crude yield) of an off-white solid. Recrystallization from ethanol afforded 2,5-dihydroxyphenyldiphenylphosphine oxide as a white solid (62.86 g, 73% recovery), m.p. 216–218° C.

2,5-Dihydroxyphenyldiphenylphosphine oxide (27.62 g, 0.0890 mol), 1-chloro-4-nitrobenzene (28.05 g, 0.1780 mol), potassium carbonate (28.00 g, 0.2026 mol), DMAC (150 mL) and toluene (130 mL) were charged into a 1 L three neck round bottom flask equipped with a mechanical stirrer, nitrogen inlet, and a Dean-Stark trap. The mixture was heated to a gentle reflux while removing water via azeotropic distillation. After ~4 hours, the toluene was removed from the reaction and the resultant solution heated at ~165° C. for ~16 hours. The reaction mixture was cooled to room temperature and then poured into water with vigorous stirring to afford a light brown solid. The crude solid was collected via filtration, washed twice with hot water, and air dried in an oven at 110° C. to afford 47.6 g (97% crude yield). Recrystallization from 2-ethoxyethanol afforded [2,5-bis(4-nitrophenoxy)phenyl]diphenylphosphine oxide as a yellow solid (39.21 g, 80% recovery), m.p. 239–242° C. $^1$H NMR (DMSO-d6) δ: 6.8 (1H, d), 7.3 (1.5H, m), 7.5 (4H, m), 7.7 (2H, m), 8.05 (1H, d), 8.3 (1H, d). $^{13}$C (DMSO-d6) ppm: 117.705, 118.186, 125.652, 126.325, 126.516, 126.820, 128.646, 128.808, 130.993, 131.296, 131.432, 132.107, 132.144, 132.410, 142.638, 142.903, 151.402, 151.577, 152.194, 152.226, 161.091, 162.177. Anal. Calcd for $C_{30}H_{21}N_2O_7P$: C, 65.22%; H, 3.83%; N, 5.07%; P, 5.61%. Found: C, 65.27%; H, 3.93%; N, 5.08%; P, 5.07%.

Into a 250 mL Parr hydrogenation flask were charged [2,5-bis(4-nitrophenoxy) phenyl]diphenylphosphine oxide (5.4 g, 0.0098 mol) and 1,4-dioxane (100 mL). The solution was warmed to effect dissolution with subsequent cooling to room temperature upon which 10% Pd/C (0.59 g) was added. The mixture was degassed prior to the introduction of hydrogen gas. The mixture was agitated under a hydrogen atmosphere for ~24 hours at room temperature. After degassing the solution, the Pd/C was removed by filtration and the solution added to stirred water to afford an off-white solid. The crude solid was collected via filtration, washed with water, and dried at room temperature to afford 4.1 g (76% crude yield). Recrystallization from aqueous ethanol afforded [2,5-bis(4-aminophenoxy)phenyl] diphenylphosphine oxide as a tan solid (3.2 g, 80% recovery), m.p. 205–208° C. Anal. Calcd. for $C_{30}H_{25}N_2O_3P$: C, 73.16%; H, 5.12%; N, 5.69%; P, 6.29%. Found: C, 72.87%; H, 5.08%; N, 5.78%; P, 5.64%.

Polyamide Acid Preparation. The polyamide acids were prepared by placing the diamine in DMAC in a nitrogen atmosphere and stirring at room temperature to form a solution or slurry and subsequently adding a stoichiometric quantity of the dianhydride as a solid or in some cases as a slurry in DMAC. The solids content was adjusted to 20.0% (weight to weight, w/w) by the addition of DMAC. The reaction was stirred at ambient temperature for about 24 hours to form a viscous solution of the polyamide acid. The inherent viscosities of the polyamide acids are presented in FIGS. 3–6.

A 30,000 g/mole endcapped polyimide was also prepared as follows. The polyamide acid was prepared as described above by upsetting the stoichiometry in favor of the diamine. After stirring the polyamide acid solution in a nitrogen atmosphere for about 24 hours at ambient temperature, a stoichiometric quantity of phthalic anhydride was added as the endcapping agent and the reaction was stirred for 6 hours to yield a polyamide acid with an inherent viscosity of 0.55 dL/g. The polyamide acid was thermally converted to polyimide as described in the "films" section below.

Polyimide Preparation in Meta-Cresol. Polyimides were prepared directly in m-cresol because the DMAC solutions of the polyamide acids would not form flexible films after curing at 250 or 300° C. The polyimides indicated in FIGS. 5 and 6 were prepared by adding the diamine to m-cresol containing a catalytic amount of isoquinoline and stirring under a nitrogen atmosphere for about 0.5 hour at room temperature. A stoichiometric quantity of dianhydride was added, the solids content was adjusted to 20.0% (w/w), the reaction was heated to 200° C. and stirred at 200° C. under a nitrogen atmosphere for 4–6 hours to form a viscous solution. The cooled polyimide solution was diluted with m-cresol and poured into methanol in a blender to precipitate a fibrous solid that was isolated, subsequently washed in boiling methanol twice and dried in air at 150° C. for 4 hours. The polyimides were dissolved in DMAC for inherent viscosity measurements and film casting. Polymer characterization is presented in FIGS. 5 and 6.

Films. Thin films (0.025 to 0.076 mm) were cast from polyamide acid and polyimide solutions in DMAC generally at 20% solids (w/w) content. In some cases the solutions of highly viscous polyamide acid solutions were diluted to 10–15% solid contents to allow bubbles to escape from the solution prior to film casting. The solutions were generally centrifuged and the decantate doctored onto clean, dry plate-glass and dried to a tack-free form in a low humidity air chamber overnight at room temperature. At 20% solids content, a wet film of 0.64 mm was doctored onto the glass plate. The films were stage-cured in forced air ovens by heating for 1 hour each at 100, 150, 200, and 250° C. and in some cases for an additional hour at 300° C. and another hour at 350° C. No attempt was made to control the heatup and cooldown rates of the ovens. In most cases, the, thin films were removed from the glass by immersion in water. Specimens (15.2 cm long, 0.51 cm wide, 0.038 to 0.056 mm thick) were cut with a JDC Precision Sample Cutter, Thwing-Albert Instrument Company. The tensile properties were determined following the general procedure in ASTM D882 using four to five specimens per test condition. The test specimen gauge length was 5.1 cm and the crosshead speed for film testing was 0.51 cm/minute using a Sintech 2 instrument with an Eaton Model 3397-139 11.4 kg load cell.

Other Characterization. Melting points were determined on a Thomas-Hoover capillary melting point apparatus and are uncorrected. Differential scanning calorimetry (DSC) was conducted on a Shimadzu DSC-50 thermal analyzer with the sample sealed in an aluminum pan. Glass transition temperatures (Tgs) were determined with DSC at a heating rate of 20° C./min with the Tg taken at the inflection point of the ΔT versus temperature curve. The crystalline melting points (Tms) were taken at the endothermic peak. Inherent viscosities ($\eta_{inh}$) were obtained on 0.5% (w/v) polyamide acid and polyimide solutions in DMAC at 25° C. Dynamic thermogravimetric analyses (TGA) were determined on films using a Seiko Instrument SSC 5200 at a heating rate of 2.5° C./min in a nitrogen atmosphere. Elemental Analyses were performed by Desert Analytics, Tucson, Ariz. The % light transmission through thin films was measured using a Perkin-Elmer Lambda 900 ultraviolet/visible/near infrared spectrometer. Solar absorptivities ($\alpha$) of thin films were measured on an Aztek Model LPSR-300 spectroreflectometer with measurements taken between 250 to 2800 nm with a vapor deposited aluminum on Kapton® film ($1^{st}$ surface mirror) as a reflective reference per ASTM E903-82. An Aztek Temp 2000A infrared reflectometer was used to measure the thermal emissivity ($\epsilon$) of thin films.

Synthesis. Polyimides in FIGS. 3–6 were made via the polyamide acids from the reaction of an aromatic diamine with an aromatic dianhydride in DMAC at 20.0% solids content (w/w) or in m-cresol. Polymers 6-1/A and 6-1/S in FIG. 6 were made in m-cresol containing a catalytic amount of isoquinoline because polyamide acids with inherent viscosities >0.40 dL/g could not be obtained. Polymer 5-1/A in FIG. 5 was made via the polyamide acid but also in m-cresol in an attempt to obtain a higher molecular weight version. The synthesis in m-cresol provided an improvement in the molecular weight (inherent viscosities in DMAC increased from 0.72 dL/g for the polyamide acid to 0.83 dL/g for the polyimide). The polymer reported herein (5-1/S) was made via the polyamide acid and had an inherent viscosity in DMAC of 1.46 dL/g and a Tg of 280° C.

In preparing the various polymers, it was apparent that the reactivity of a-BPDA was significantly less than that of s-BPDA. Using the same diamine, the DMAC solution viscosity of the polyamide acid from s-BPDA increased substantially within 1 hour of reaction time whereas the viscosity of the polyamide acid from a-BPDA increased slowly over several hours and only in a few cases attained a solution viscosity comparable to that of the corresponding s-BPDA polyamide acid. The a-BPDA polyamide acid had a higher inherent viscosity than the analogous s-BPDA polyamide acid in only one set of polymers (polymers 4-2/A and 4-2/S in FIG. 4).

Glass Transition Temperatures. All of the polyamide acids in FIG. 3 from the reaction of diamine monomers 1–3 with a-BPDA and s-BPDA were made in high molecular weights as indicated by inherent viscosities of 0.95 to 2.13 dL/g. In FIG. 3, the a-BPDA polyimides had Tgs higher than the corresponding s-BPDA derived polyimides.

All of the polyamide acids in FIG. 4 were prepared in relatively high molecular weights with inherent viscosities of 0.73 to 2.20 dL/g. The same Tg trend was observed where all of the a-BPDA polyimides had Tgs higher than the s-BPDA polyimides. The diamines were meta catenated [monomer 4, 1,3-bis(3-aminophenoxy)benzene, 1,3,3-APB], meta para connected [monomer 5, 1,3-bis(4-aminophenoxy)benzene, 1,3,4-APB] and all para catenated [monomer 6, 1,4-bis(4-aminophenoxy)benzene, 1,4,4-APB].

FIG. 5 contains information on four polyimides containing trifluoromethyl groups from diamine monomers 7 and 8. Again the a-BPDA polyimides had Tgs higher than the s-BPDA polyimides. The rigid biphenylene polymers (5-1/A and 5-1/S) had Tgs significantly higher than the hexafluoroisopropylidene containing polymers.

Figure 6:
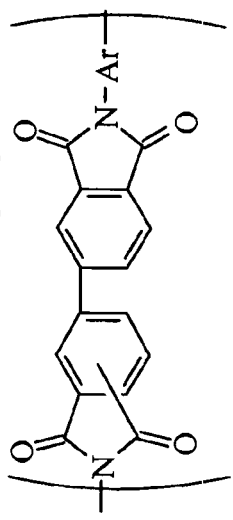

Four polyimides containing the phenylphosphine oxide group from monomers 9 and 10 are reported in FIG. 6. The polyimides from 1,3,3-APB containing phenylphosphine oxide had Tgs about 30° C. less than polyimides from the more rigid 1,4,4-APB containing phenylphosphine oxide. The s-BPDA/1,4,4-APB phenylphosphine oxide polyimide failed to show any crystallinity apparently because the bulky diphenylphosphine oxide group disrupts the symmetry or regularity leading to ordered regions.

Films. In forming films, all of the polyamide acid and polyimide solutions in FIGS. 3–6 were doctored onto clean plate glass and stage-dried in a forced air oven for 1 hour each at 100, 150, 200 and 250° C. No intentional orientation was performed although some could have occurred while curing on the glass plates. The films were generally removed from the glass plates by immersion in water. In most cases, the film pulled glass from the surface of the plates, resulting in wrinkles. Although the Tg of several of the cured films exceeded 250° C., all of the initial films were cured at 250° because film color was of particular interest. Generally polymers are cured beyond the Tg because the molecular motion above the Tg allows tenaciously held molecules (e.g. solvent) to depart more easily and induces molecular packing. However, most films described herein cured at temperatures >250° C. in air tended to darken slightly in color. Near colorless films turned pale yellow while yellow films often became more intense yellow to orange. Some films were also cured at temperatures >250° C. Higher cure temperatures generally improved the tensile properties at the sacrifice of color. Curing in a nitrogen atmosphere would have been desired and probably would have helped reduce the color of some films but the ovens could not be properly rigged to provide a good nitrogen atmosphere. Since the presence of residual solvent and complete conversion of the polyamide acid to polyimide was a concern, a study was performed primarily to evaluate color, Tg, and tensile properties as a function of cure temperature.

All of the thin film tensile properties are reported as averages of 4 to 5 specimens. The coefficient of variation (COV) within 4 to 5 specimens for the tensile strengths was 2 to 10% while the COV for the moduli was about 0.2 to 8%. The COV for the elongation was high with values ranging from 7 to 50%. Film elongation is more sensitive to flaws within the test specimens caused by foreign particles (e.g. gel particles and dust), minor specimen misalignment during the test, wrinkles, etc. The 23° C. tensile properties, particularly strength and modulus, of the s-BPDA based polyimide films were higher, and in some cases significantly higher, than those of the a-BPDA based polyimide films with few exceptions. The highest overall 23° C. tensile properties are those for the film from polymer 6-2/S in FIG. 6 with strength of 151.0 MPa, modulus of 4.34 GPa and elongation of 31%. Polymer 4-2/S had the highest elongation (90%) while polymer 5-1/S gave the highest film modulus (5.18 GPa).

Films of a 30,000 g/mole phthalic anhydride endcapped polyimide of polymer 4-1/A in FIG. 4 were cured for 1 hour at 250° C. and 1 hour at 300° C. in air. The films showed slightly lower Tgs as mentioned previously but no visual difference in color when compared with the corresponding films in FIGS. 4 and 7. The thin film 23° C. tensile properties for the 250 and 300° C. cured films were virtually the same with strength of 100.0 MPa, modulus of 3.02 GPa and elongation of 4.0%. These values compare favorably with the tensile properties of the corresponding films in FIGS. 4 and 7.

Films Cured at Different Temperatures. Films of the four polyimides (4-1/A, 4-1/S, 4-3/A and 4-3/S) were cured on clean plate glass in a forced air oven for 1 hour each at temperatures of 250, 300 and 350° C. FIG. 7 contains information on the a-BPDA polyimides while FIG. 8 presents the data on the s-BPDA polyimides. In FIG. 7, the properties of two batches of the polyamide acids from a-BPDA/1,3,3-APB and a-BPDA/1,4,4-APB and their films cured at different temperatures are presented. Two batches of each of the two polymers were made to assess the reproducibility of the polyamide acid formation and polyimide properties. The inherent viscosity of the polyamide acids and the Tg, color and tensile properties of the films overall showed excellent reproducibility. The only large variation was the 43.7% elongation of one 350° C. cured film. As observed for the same polyimides in FIG. 4 (4-1/A and 4-3/A) and previously discussed, the tensile strength and especially the modulus of the a-BPDA/1,3,3-APB films were higher than those of the a-BPDA/1,4,4-APB films. The advantageous effects of curing at high temperatures are evident in the increase in Tgs for both polymers and the increase in film elongation for the 1,4,4-APB polymer.

In FIG. 8, the properties of the s-BPDA/1,3,3-APB and 1,4,4-APB polyamide acids and polyimide films are presented. Unlike that of the a-BPDA polymers, the s-BPDA polyimides showed the expected trend with the polyimide from the more rigid diamine (1,4,4-APB) having the higher tensile strength and modulus. Overall the properties of the 250° C. cured films in FIG. 8 compared favorably with the properties of the corresponding polymers (4-1/S and 4-3/S) in FIG. 4. The Tg and the elongation of the 1,4,4-APB polymer film increased with an increase in the cure temperature.

Thermogravimetric Analysis of Films. Samples of the films in FIG. 7 were characterized by TGA in nitrogen at a heating rate of 2.5° C./minute. Prior to TGA, the films were dried for 0.5 hour at 100° C. in nitrogen to remove absorbed moisture. The weight losses at different temperatures are reported in FIG. 9. This analysis was performed on films of 2 polymers cured at 250, 300, and 350° C. to determine the weight loss as a function of curing temperature. As presented in FIG. 10, very low weight losses (0.09 and 0.12%) were detected at 300° C. for the 250° C. cured films. The Tg of the a-BPDA/1,3,3-APB polyimide was 204° C. while the Tg for the a-BPDA/1,4,4-APB polyimide was 276° C. Hence curing the later film at 250° C., significantly less than the Tg, had virtually no effect upon retention of residual DMAC from film casting. The low weight losses at 300 and even 350° C. are presumably due to residual DMAC and/or water from further cyclodehydration of the amide acid to the imide. Other films were not characterized by TGA because it was assumed that the results would be similar. The excellent thermal stability of the polymers is obvious from the low weight losses at 500° C. at a heating rate of only 2.5° C./minute.

Figure 11:
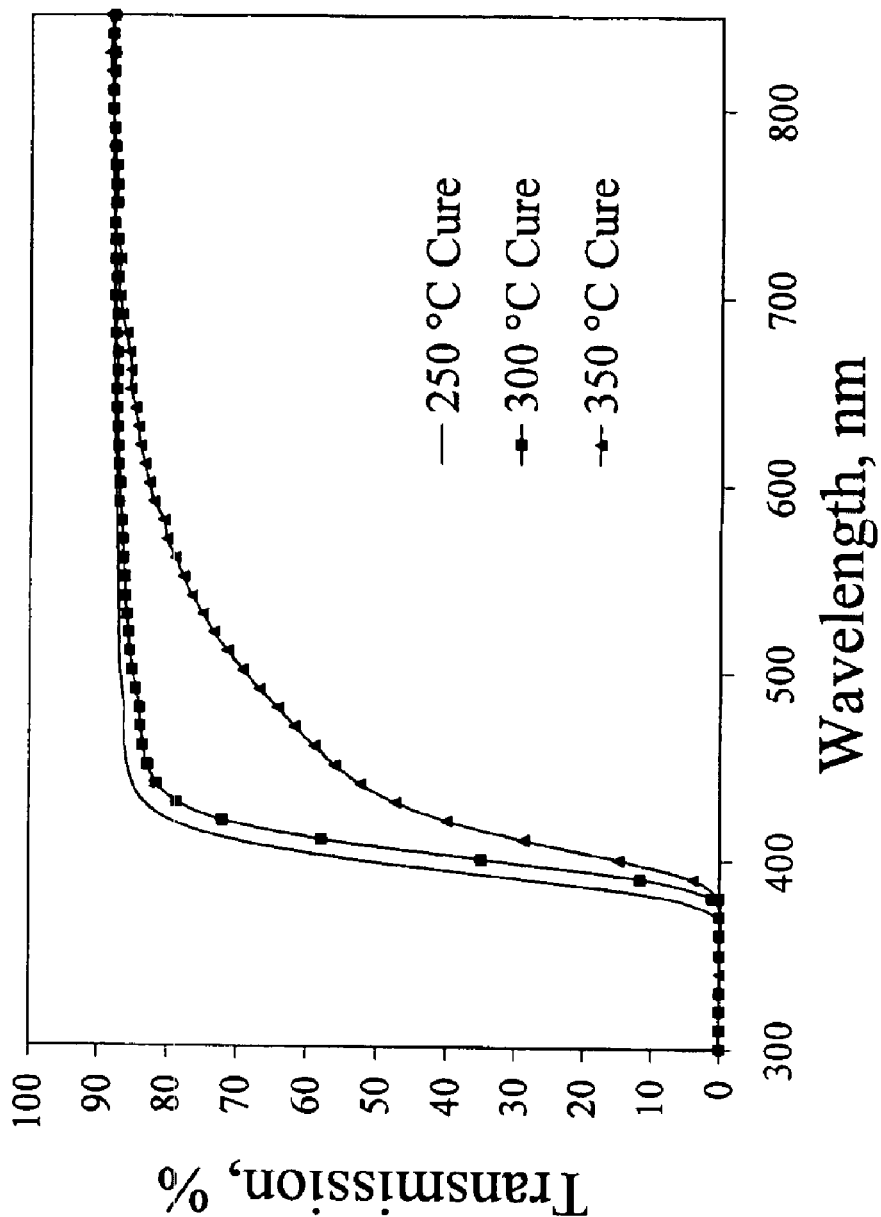
FIG. 11 is a graph representing light transmission of a-BPDA/1,3,3-APB film.

Color, Solar Absorptivity and Thermal Emissivity. In virtually all cases, the a-BPDA films had less color than the corresponding s-BPDA films. A few of the a-BPDA films cured at 250° C. were virtually colorless. The color designation in FIGS. 3–8 follows the trend from lightest to most intense or darkest: near colorless<pale yellow<light yellow<yellow<intense yellow<light orange<orange. The optical transparency or % light transmission through the film at a wavelength of 500 nm (the solar maximum) was determined for several films with the values reported in FIGS. 7 and 8. Film thickness varied from 0.38 to 0.046 mm. The thickest film was the a-BPDA/1,3,3-APB polyimide and it had the highest optical transparency. The a-BPDA films in FIG. 7 have a higher % light transmission than the corresponding s-BPDA films in FIG. 8. The films derived from the polyimides made with the flexible 1,3,3-APB diamine had greater light transmission than those made from the more rigid 1,4,4-APB diamine. Light transmission decreased as the cure temperature of the film increased and this is clearly shown in FIG. 11 for the a-BPDA/1,3,3-APB film in FIG. 7. The % light transmission at 500 nm for 4 other lightly colored films is 87 for 5-1/A (0.83 dL/g polymer), 85 for 5-1/S, 85 for 6-1/A and 75 for 6-1/S. Again the a-BPDA films had better optical transparency than the s-BPDA films.

Two of several properties of importance for space applications are absorptivity ($\alpha$) and thermal emissivity ($\epsilon$). Solar absorptivity pertains to the fraction of incoming solar energy that is absorbed by the film or more precisely a measure of light reflected by a second surface mirror between 250 and 2500 nm. The ($\epsilon$) is a measure of the film to radiate energy from the surface or more specifically a measure of the infrared transmission of the film. Both of these properties were measured for films in FIGS. 4–6 and are reported in FIG. 10. Film thickness must be considered in comparing values. Depending upon the space application, the ratio of ($\alpha$) to ($\epsilon$) is more important than the individual values because it helps to determine the temperature a film will reach in a particular orbit. The ability of a material to undergo minimal changes in these properties upon exposure to radiation in space is of significant importance. In general, the a-BPDA polymeric films exhibited lower $\alpha$s than films from s-BPDA polyimides.

We claim:

1. A polyimide film prepared from reacting 2,3,3',4-biphenyltetracarboxylic dianhydride with an aromatic diamine selected from the group consisting of:

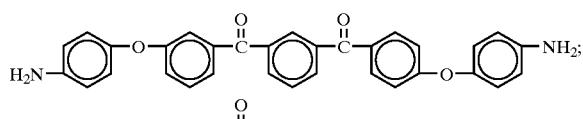

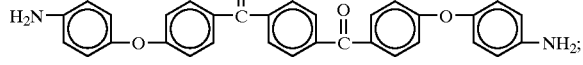

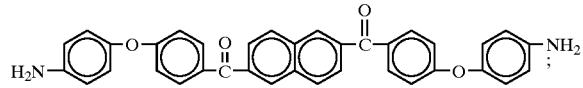

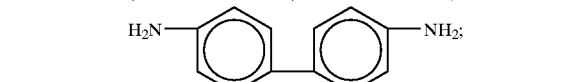

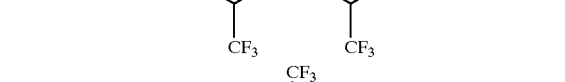

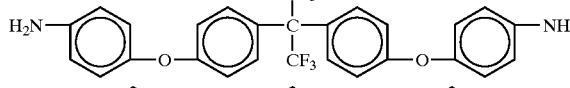

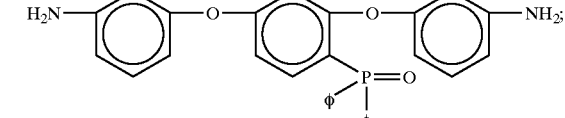

-continued

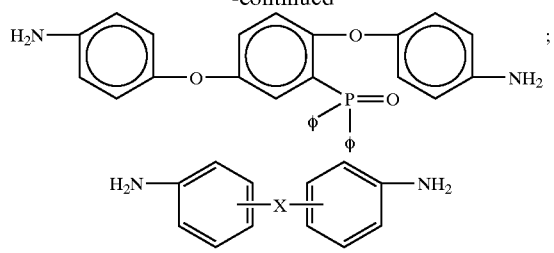

wherein X is selected from the group consisting of:

SO$_2$, C(CH$_3$)$_2$, C(CF$_3$)$_2$, C(CH$_3$)phenyl, C(CF$_3$)phenyl, 3,4'–O, 3,3'–O,

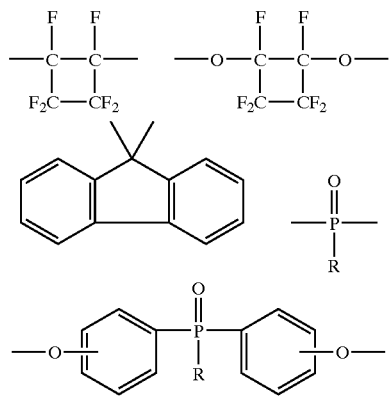

wherein R is phenyl and CH$_3$,

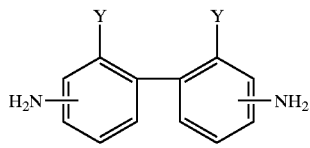

wherein Y is selected from the group consisting of CH$_3$, phenyl, chloro and bromo;

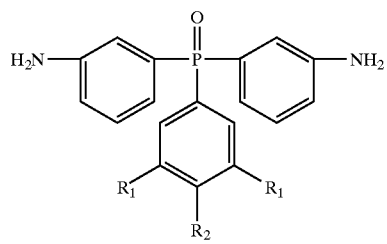

wherein R$_1$ is CF$_3$ and R$_2$ is H, and wherein R$_1$ is H and R$_2$ is CF$_3$;

and

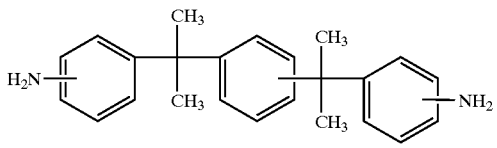

further wherein the polyimide film has the following combination of properties:

a thickness of from about 0.02 mm to about 0.06 mm;
light transmission at 500 nm of greater than about 60%;
thermal emissivity of greater than about 0.46;
solar absorptivity of less than about 0.16; and
tensile strength greater than about 93.8 MPa.

2. A polyimide film according to claim 1 wherein the aromatic diamine is:

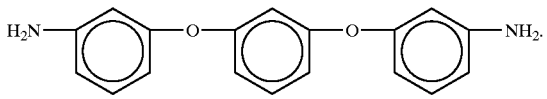

3. A polyimide film according to claim 1 wherein the aromatic diamine is:

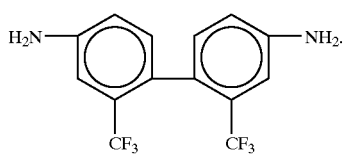

4. A polyimide film according to claim 1 wherein the aromatic diamine is:

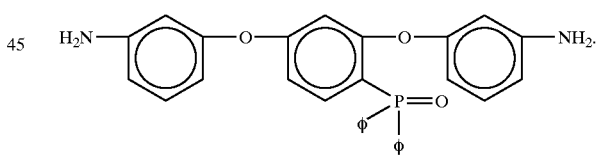

5. A coating prepared from the polyimide film of claim 1.

6. A solar sail prepared from the polyimide film of claim 1.

7. A sunshade prepared from the polyimide film of claim 1.

8. A polyimide film according to claim 1 wherein the number average molecular weight is greater than 10,000 g/mole.

* * * * *